United States Patent
Shen

(10) Patent No.: US 8,045,547 B2
(45) Date of Patent: Oct. 25, 2011

(54) METHOD AND APPARATUS FOR ROUTING AND FORWARDING BETWEEN VIRTUAL ROUTERS WITHIN A SINGLE NETWORK ELEMENT

(75) Inventor: Naiming Shen, San Jose, CA (US)

(73) Assignee: Ericsson AB, Stockholm (SE)

( * ) Notice: Subject to any disclaimer, the term of this patent is extended or adjusted under 35 U.S.C. 154(b) by 1131 days.

(21) Appl. No.: 10/883,425

(22) Filed: Jun. 30, 2004

(65) Prior Publication Data

US 2004/0240429 A1 Dec. 2, 2004

Related U.S. Application Data

(62) Division of application No. 10/265,789, filed on Oct. 7, 2002, now Pat. No. 6,907,039.

(60) Provisional application No. 60/397,353, filed on Jul. 20, 2002.

(51) Int. Cl.
*H04J 1/16* (2006.01)
*H04L 12/28* (2006.01)
*H04L 12/56* (2006.01)

(52) U.S. Cl. ........ 370/387; 370/389; 370/401; 370/241; 370/229

(58) Field of Classification Search .......... 370/389, 370/401, 400, 387, 229, 230, 230.1, 231, 370/232, 233, 234, 369, 386, 399, 422; 709/241
See application file for complete search history.

(56) References Cited

U.S. PATENT DOCUMENTS

| | | | |
|---|---|---|---|
| 5,550,816 A * | 8/1996 | Hardwick et al. ............ 370/397 |
| 5,920,699 A | 7/1999 | Bare |
| 6,148,411 A * | 11/2000 | Ichinohe et al. .................. 714/4 |
| 6,151,635 A | 11/2000 | Bare |
| 6,192,051 B1 | 2/2001 | Lipman et al. |
| 6,205,488 B1 | 3/2001 | Casey et al. |
| 6,397,260 B1 | 5/2002 | Wils et al. |
| 6,496,510 B1 | 12/2002 | Tsukakoshi et al. |
| 6,556,547 B1 * | 4/2003 | Srikanth et al. ............... 370/317 |
| 6,560,236 B1 | 5/2003 | Varghese et al. |
| 6,597,699 B1 | 7/2003 | Ayres |
| 6,609,153 B1 | 8/2003 | Salkewicz |
| 6,674,756 B1 | 1/2004 | Rao et al. |
| 6,907,039 B2 | 6/2005 | Shen |
| 7,085,827 B2 | 8/2006 | Ishizaki et al. |
| 7,133,365 B2 | 11/2006 | Klinker et al. |

(Continued)

OTHER PUBLICATIONS

Gopal L, R., "Separation of control and forwarding plane inside a network element", Jul. 3-5, 2002, IEEE, ISBN: 0-7803-7600-5, pp. 161-166.*

(Continued)

*Primary Examiner* — Kwang B Yao
*Assistant Examiner* — Adam Duda
(74) *Attorney, Agent, or Firm* — Blakely Sokoloff Taylor & Zafman LLP

(57) ABSTRACT

A method and apparatus for routing and forwarding between virtual routers is described. A method in a single network element comprises peering a first virtual router to a second virtual router, wherein the first and second virtual routers have separate address spaces and separate routing tables, distributing a set of one or more routes from the first virtual router to the second virtual router, wherein a first of the set of routes identifies the first virtual as a next hop of the first route, said first route including a destination, and downloading to a set of one or more forwarding tables, the destination and the next hop.

5 Claims, 7 Drawing Sheets

U.S. PATENT DOCUMENTS

| | | | |
|---|---|---|---|
| 7,209,976 | B2 | 4/2007 | Folkes et al. |
| 7,242,665 | B2 | 7/2007 | Langille et al. |
| 7,260,648 | B2 | 8/2007 | Tingley et al. |
| 7,272,634 | B2 | 9/2007 | Sarkar et al. |
| 7,274,704 | B1 | 9/2007 | Ould-Brahim et al. |
| 7,464,152 | B2 | 10/2008 | Ishizaki et al. |
| 7,715,381 | B2 | 5/2010 | Shen |
| 7,769,862 | B2 | 8/2010 | Singh et al. |
| 2001/0048661 | A1 | 12/2001 | Clear et al. |
| 2002/0067725 | A1 | 6/2002 | Oguchi et al. |
| 2002/0097730 | A1 | 7/2002 | Langille et al. |
| 2002/0099849 | A1 | 7/2002 | Alfieri et al. |
| 2002/0133534 | A1 | 9/2002 | Forslow |
| 2002/0184387 | A1 | 12/2002 | Yamaya et al. |
| 2003/0051048 | A1* | 3/2003 | Watson et al. ............ 709/238 |
| 2003/0123446 | A1 | 7/2003 | Muirhead et al. |
| 2003/0126233 | A1 | 7/2003 | Bryers et al. |
| 2003/0169747 | A1* | 9/2003 | Wang ............... 370/400 |
| 2004/0073715 | A1 | 4/2004 | Folkes et al. |
| 2004/0076160 | A1 | 4/2004 | Phaltankar |
| 2004/0165581 | A1 | 8/2004 | Oogushi |
| 2004/0233913 | A1 | 11/2004 | Shen |
| 2004/0240429 | A1 | 12/2004 | Shen |
| 2004/0240455 | A1 | 12/2004 | Shen |
| 2005/0281249 | A1 | 12/2005 | Chander et al. |
| 2007/0183421 | A1 | 8/2007 | Terrell et al. |

OTHER PUBLICATIONS

Bjorkman, N. et al., "Open control of partitioned switches", Jun. 26-29, 2000, IEEE, ISBN: 0-7803-5884-8, pp. 549-556.*

McDysan, D. et al., "Multiservice networking using a component-based switch and router architecture", Jun. 26-29, 2000, IEEE, pp. 97-104.*

Gopal, Ram, "Forwarding Element Model", Feb. 2002, Internet Engineering Task Force (IETF) Working Group ForCES, Internet Draft, pp. 1-14.*

Yu, Jessica, "Network Based IP VPN Architecture using Virtual Routers", Feb. 19, 2001, CoSineCommunications, all slides.*

Aweya, "On the design of IP routers. Part 1: Router Architectures", Apr. 2000, Journal of Systems Architecture, vol. 46 Issue 6, pp. 483-511.*

White, "Catalyst 8500 CSR Architecture", 1988, Cirsco Systems, pp. 1-19.*

PCT/US03/20456, Nov. 14, 2003, International Search Report.

PCT/U03/20456, May 25, 2004, International Preliminary Examination Report.

Non-Final Office Action, U.S Appl. No. 10/265,789, dated Oct. 27, 2003, 10 pages.

Notice of Allowance, U.S. Appl. No. 10/265,789, dated Apr. 19, 2004, 5 pages.

Notice of Allowance, U.S. Appl. No. 10/265,789, dated Apr. 5, 2005, 5 pages.

Non-Final Office Action, U.S Appl. No. 10/883,070, dated Aug. 22, 2007, 15 pages.

Non-Final Office Action, U.S Appl. No. 10/883,070, dated Apr. 3, 2008, 8 pages.

Non-Final Office Action, U.S Appl. No. 10/883,070, dated Aug. 5, 2008, 15 pages.

Final Office Action, U.S Appl. No. 10/883,070, dated Jan. 5, 2009, 15 pages.

Non-Final Office Action, U.S Appl. No. 10/883,070, dated Jul. 10, 2009, 12 pages.

Final Office Action, U.S Appl. No. 10/883,070, dated Jan. 11, 2010, 13 pages.

Notice of Allowance, U.S Appl. No. 10/883,070, dated Sep. 17, 2010, 8 pages.

Non-Final Office Action, U.S Appl. No. 10/883,109, dated Aug. 21, 2007, 9 pages.

Non-Final Office Action, U.S Appl. No. 10/883,109, dated Feb. 22, 2008, 16 pages.

Final Office Action, U.S Appl. No. 10/883,109, dated Sep. 3, 2008, 12 pages.

Non-Final Office Action, U.S Appl. No. 10/883,109, dated Jan. 28, 2009, 10 pages.

Final Office Action, U.S Appl. No. 10/883,109, dated Sep. 11, 2009, 12 pages.

Notice of Allowance, U.S Appl No. 10/883,109, dated Dec. 29, 2009, 5 pages.

Notice of Allowance, U.S. Appl. No. 10/883,070, dated Jan. 14, 2011, 9 pages.

* cited by examiner

METHOD AND APPARATUS FOR ROUTING AND FORWARDING BETWEEN VIRTUAL ROUTERS WITHIN A SINGLE NETWORK ELEMENT

CROSS-REFERENCE TO RELATED APPLICATIONS

This application is a divisional of application Ser. No. 10/265,789, filed Oct. 7, 2002, now U.S. Pat. No. 6,907,039 which claims the benefit of U.S. Provisional Patent Application No. 60/397,353, entitled "Method and Apparatus for Routing and Forwarding Between Virtual Routers Within a Single Network Element" filed on Jul. 20, 2002.

BACKGROUND OF THE INVENTION

1. Field of the Invention

The invention relates to the field of communication. More specifically, the invention relates to communication networks.

2. Description of Prior Art

The development of virtual routers within a single network element provided certain benefits and functionality unavailable with legacy routers. For example, a single network element with virtual routers could service multiple Internet Service Providers and/or corporations with the single network element.

FIG. 1 (Prior Art) is a diagram of a single network element with virtual routers. In FIG. 1, a network element 101 includes virtual routers VR-A 111, VR-B 113, and VR-C 115. Each of the virtual routers 111, 113, and 115 respectively receive traffic from ingress ports 103A-103C and respectively transmit traffic out of the egress ports 151A-151C as illustrated in FIG. 1. The virtual router VR-A 111 receives traffic 109A from the ingress port 103A and transmits the traffic 109A out of the egress port 151A. The virtual router VR-B 113 receives traffic 109B from the ingress port 103B and transmits the traffic 109B out of the egress port 151B. The virtual router VR-C 115 receives traffic 109C from the ingress port 103C and transmits the traffic 109C out of the egress port 151C.

Network elements that support virtual routers, performed inter-VR forwarding based on the forwarding scheme described (i.e., with standard interfaces). If VR-A 111 received a packet for transmission to VR-B 113, then the VR-A 111 looked up the next hop in its routing table, found an interface that was associated with the ingress port 103B, and forwarded the packet based on that interface.

Despite the advantage offered by virtual routers and the capability of a single network element to behave as multiple routers, the virtual routers within a single network element do not communicate routing and/or forwarding information as if separate routers.

BRIEF SUMMARY OF THE INVENTION

A method and apparatus for routing and forwarding between virtual routers is described. According to one aspect of the invention, a method in a single network element provides for peering a first virtual router to a second virtual router, wherein the first and second virtual routers have separate address spaces and separate routing tables. A set of one or more routes are distributed from the first virtual router to the second virtual router, wherein a first of the set of routes identifies the first virtual router as a next hop of the first route, said first route including a destination. In addition, the method provides for downloading to a set of one or more forwarding tables, the destination and the next hop.

These and other aspects of the invention will be better described with reference to the Detailed Description and the accompanying Figures.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures, standards, and techniques have not been shown in detail in order not to obscure the invention. The terms "routing table" and "forwarding table" are used throughout the description, but are not limited to being tables. A routing table and a forwarding table may be implemented with a variety of data structures (e.g., trees, tries, linked lists, hash tables, hybrid data structures, etc.).

Figure 1:
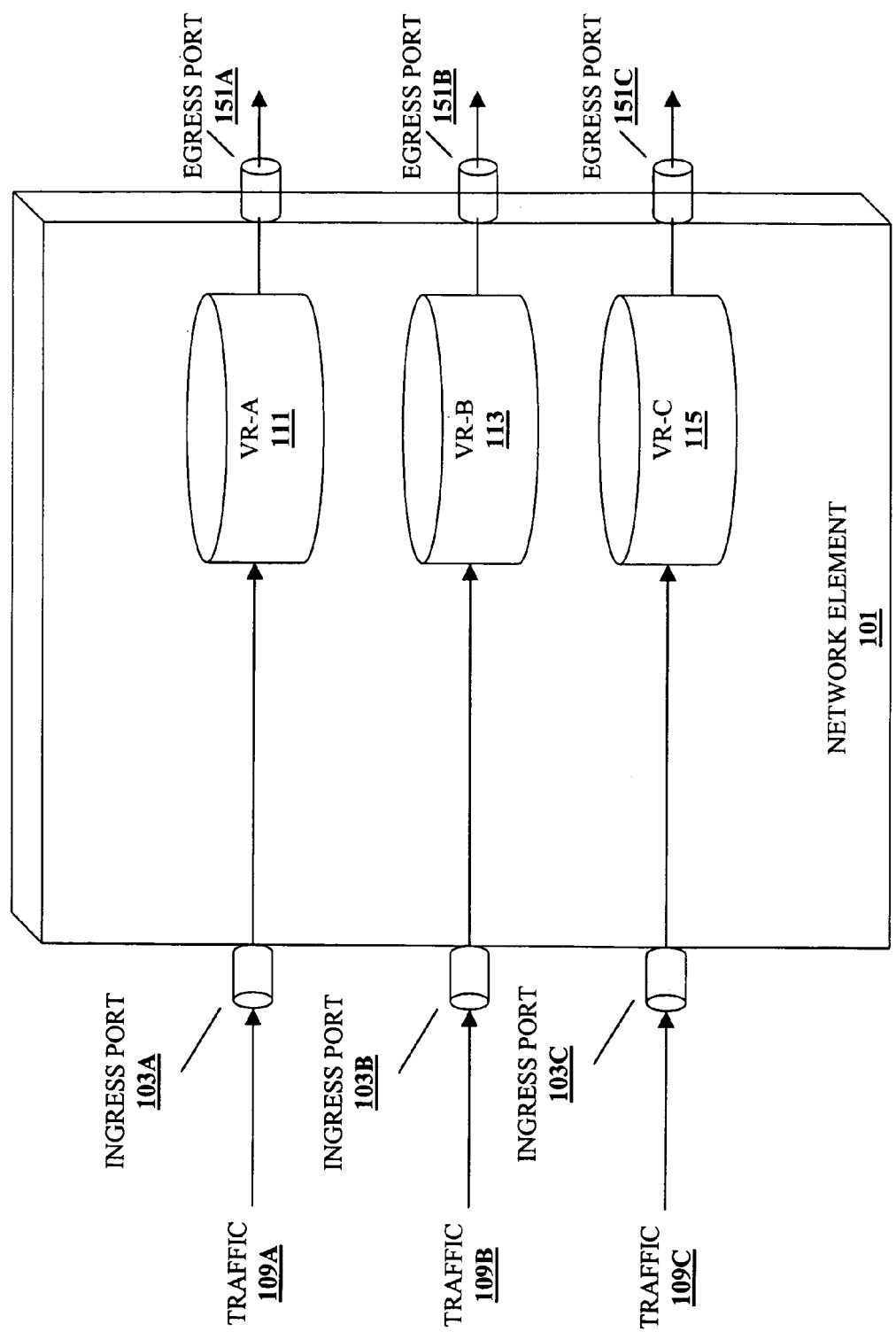
FIG. 1 (Prior Art) is a diagram of a single network element with virtual routers.
Figure 2:
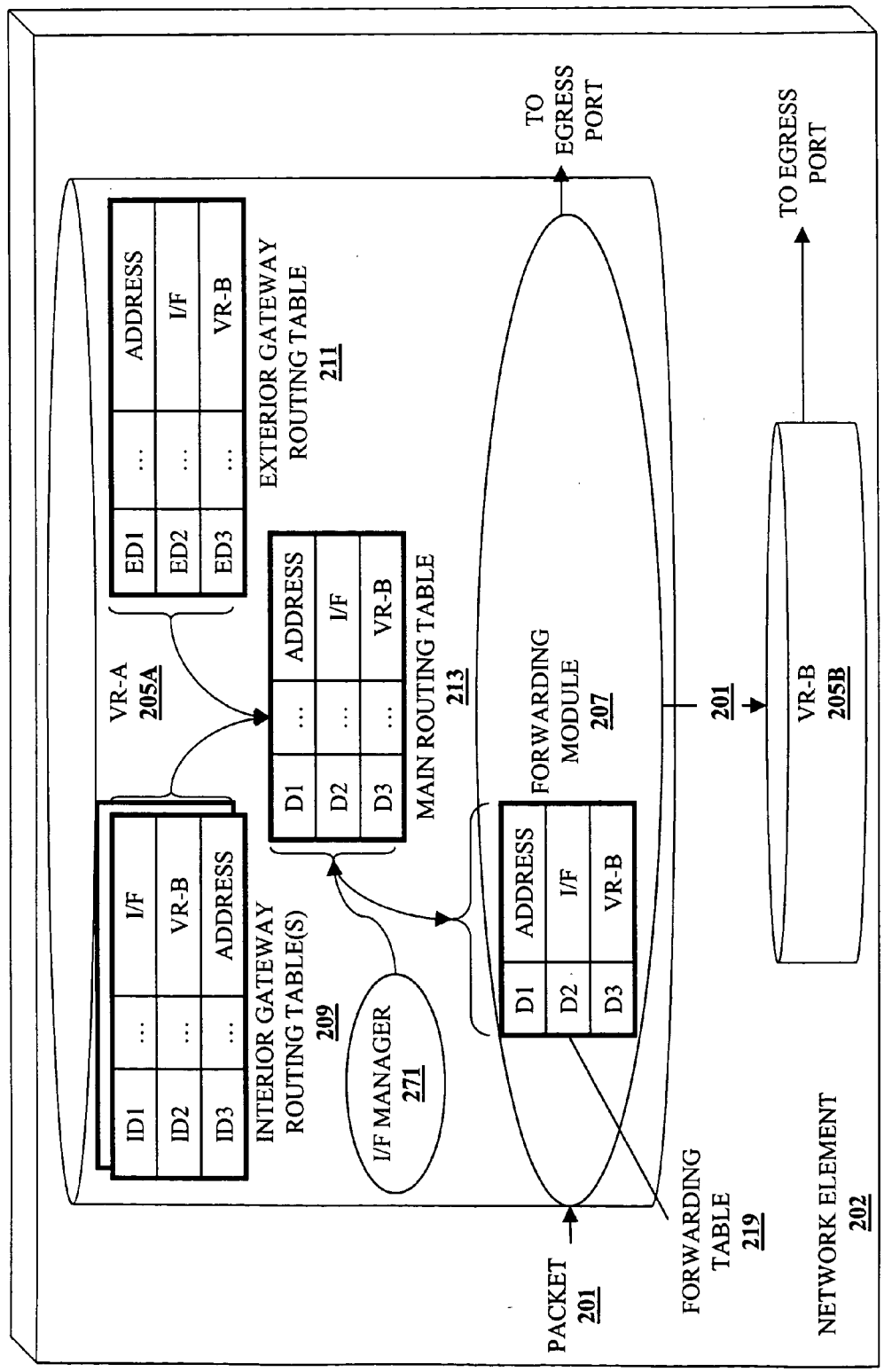
FIG. 2 is an exemplary diagram illustrating forwarding between virtual routers according to one embodiment of the invention.

FIG. 2 is an exemplary diagram illustrating forwarding between virtual routers according to one embodiment of the invention. FIG. 2 illustrates a network element 202 as including a virtual router 205A and a virtual router 205B. The virtual router 205A is identified as VR-A and the virtual router 205B is identified as VR-B.

The virtual router 205A includes interior gateway routing tables 209, an exterior gateway routing table 211, and a main routing table 213. Interior gateway routing protocol processes (e.g., OSPF, RIP, iBGP, IS-IS, etc.) build each of the interior gateway routing tables 209. The interior gateway routing tables 209 indicate routing information for reaching a destination, as determined by a corresponding interior gateway routing protocol process, that is internal to an autonomous system (AS), which includes the virtual router 205A. A process implementing an exterior gateway protocol (e.g., BGP-v4, EGP, etc.) builds the exterior gateway routing table 211. The exterior gateway routing table 211 indicates routing information for reaching destinations external to the AS of the virtual router 205A. The main routing table 213 is built using route entries from the interior gateway routing tables 209, the exterior gateway routing table 211, and interfaces from an interface manager 271.

The interface manager 271 includes a data structure that indicates interfaces and their corresponding reachable IP addresses via the interfaces. In certain embodiments of the invention, the interface manager also associates lower layer hardware information learned from lower layer protocols with interfaces. Each routing process exchanges routing information with other network elements through interfaces and install learned reachable routes into the main routing table, which are eventually downloaded into forwarding tables of the data plane from the main routing table in the control plane. The interface manager 271 indicates and maintains a status for each interface of the host network element. A routing process utilizes interface status to make correct routing decisions.

The first column of each entry within each of the routing tables 209, 211, and 213 indicates a destination. The last column of each entry within each of the routing tables 209, 211, and 213 as illustrated in FIG. 2 indicates a next hop. A next hop is either an interface next hop (i.e., a logical or physical interface) or a non-interface next hop (e.g., an IP address, a virtual router name, etc.). The remaining columns within each of the routing tables 209, 211, and 213 indicate additional routing information, such as line, metrics, etc.

The virtual router 205A also includes a forwarding module 207 and a forwarding table 219. The forwarding module 207 forwards packets that are received by the virtual router 205A in accordance with the forwarding table 219. The forwarding table 219 receives information downloaded from the main routing table.

In the example illustrated by FIG. 2, the interior gateway routing tables 209 includes internal destinations ID1, ID2, and ID3 with corresponding next hops I/F1, VR-B, and ADDRESS, respectively. ID1, ID2 and ID3 are identifying data (e.g., IP addresses, prefixes, etc.) of other network elements within the same AS as the virtual router 205A. One or more of the internal destinations may also be another virtual router within the same network element (e.g., ID1 may be VR-B). While in one embodiment of the invention, internal destinations that are other virtual routers are identified with a virtual router identifier (i.e., virtual router handle), alternative embodiments of the invention may identify an internal destination with other techniques (e.g., IP address, inter-VR interface, etc.). The next hop I/F is a physical interface and the next hop VR-B may be a logical interface that indicates a VR instead of an IP address (i.e., an inter-VR interface), a virtual router handle, etc.

An inter-virtual router next hop is a unique value within the network element 202 that identifies a specific virtual router. When an administrator creates a virtual router, the administrator provides a user-friendly virtual router identifier ("VR name") for the created virtual router. In response to the creation of a virtual router, the network element 202 creates and associates a unique virtual router identifier ("VR identifier") to be utilized by the network element 202 to identify the created virtual router. While in one embodiment inter-virtual router next hops in the routing tables are VR identifiers, alternative embodiments of the invention may utilize alternative techniques to identify inter-VR next hops (e.g., the routing table indicates the VR name and a table that associates the VR name to a VR identifier is used to access the VR identifier, an inter-VR interface value is created within the network element and associated with a VR-identifier or VR-name in another data structure, etc.). For the purposes of this description, an inter-VR next hop is the VR identifier.

The exterior gateway routing table 211 as illustrated in FIG. 2 indicates external destinations ED1, ED2, and ED3 and corresponding next hops ADDRESS, I/F2, and VR-B, respectively. As with the internal destinations, the external destinations ED1, ED2, and ED3 can be IP addresses, prefixes, etc. While in one embodiment of the invention, external destinations that are other virtual routers are identified by an IP address or prefix, in alternative embodiments of the invention the external destination may be a VR name or VR identifier.

When the forwarding module 207 receives a packet 201, the forwarding module 207 determines the destination of the packet 201. The destination of the packet 201 is looked up in the forwarding table 219 to determine the appropriate outgoing interface. If the destination of the packet 201 is ID1, then the forwarding module 207 forwards the packet 201 to an egress port that corresponds to the outgoing interface I/F. If the destination of the packet 201 is ED3, then the forwarding module 207 forwards the packet 201 to the virtual router 205B. If the packet 201 is forwarded to the virtual router 205B, the virtual router 205B will process the packet 201 in accordance with its forwarding/routing information (e.g., drop the packet 201, forward the packet 201 to the appropriate egress port, forward the packet 201 to another virtual router, etc.).

The decision mechanism for determining whether a packet will be forwarded to an egress port or another virtual router can be implemented with a variety of techniques. In one embodiment of the invention, the forwarding module determines if the next hop indicated by the forwarding table for a packet is an inter-VR next hop. If the next hop is an inter-VR next hop then the corresponding packet is forwarded to the appropriate virtual router. If the next hop is not an inter-VR next hop (e.g., a logical or physical interface that does not indicate a virtual router, an IP address, etc.), then the packet is processed accordingly (e.g., if the next hop is a physical interface, then the packet is processed at lower layers in order to forward the packet along the appropriate hardware lines to the egress port). In another embodiment of the invention, a switching module is implemented separately from the forwarding module. If the next hop for a packet is a physical interface, then the forwarding module passes the packet to the switching module, which forwards the packet along the hardware lines that correspond to the physical interface. If the next hop is an inter-VR next hop, then the forwarding module forwards the packet to the appropriate virtual router.

In addition other techniques can be used to determine whether the next hop is a virtual router, an IP address, a physical interface, a logical interface, etc. In one embodiment of the invention, an additional field is included in each routing and forwarding table entry to explicitly indicate a type for the outgoing interface. In another embodiment of the invention, the value of the next hop implicitly indicates whether the next hop is a VR next hop or non-VR next hop.

Enabling inter-VR routing and forwarding provides additional functionality. A service provider that is a customer of a network provider, which owns a network element with inter-VR routing and forwarding, can allow its virtual private network (VPN) customers to exchange routes. In addition, inter-VR routing and forwarding enables a service provider's VPN customers to use the provider's network for Internet access. Inter-VR routing and forwarding can also be utilized to allow service providers to announce VPN customers' routes if they are part of the public address space.

Inter-VR routing and forwarding also enables virtual routers to replace customer premise equipment (CPE) routers. The service provider and/or network provider can utilize a virtual router to perform the tasks typically performed by a CPE router, especially for those customers that access the network from multiple locations.

If multiple customers of a network provider are on the same network element with virtual routers, then inter-VR routing and forwarding enables local area, metro area, and/or intra-continental private peerings without utilizing physical lines and/or ports to connect virtual routers.

Inter-VR routing and forwarding also provides additional capabilities with respect to testing and parallel network inter-communication. Since virtual routers can be connected without wires, then numerous virtual routers can be peered or connected to represent the topology of actual networks. The inter-VR routing and forwarding can then be used to simulate routing in different network topologies without cables and wires. For parallel network inter-communication, a service provider with an operational legacy network and a next generation network can utilize inter-VR routing and forwarding for experimental, trial, and/or operational exchanges of routes between the different networks (assuming the different networks include virtual routers within individual network elements). Moreover, the service provider can utilize inter-VR routing and forwarding to migrate their customers from a legacy network to a next generation network.

Figure 3A:
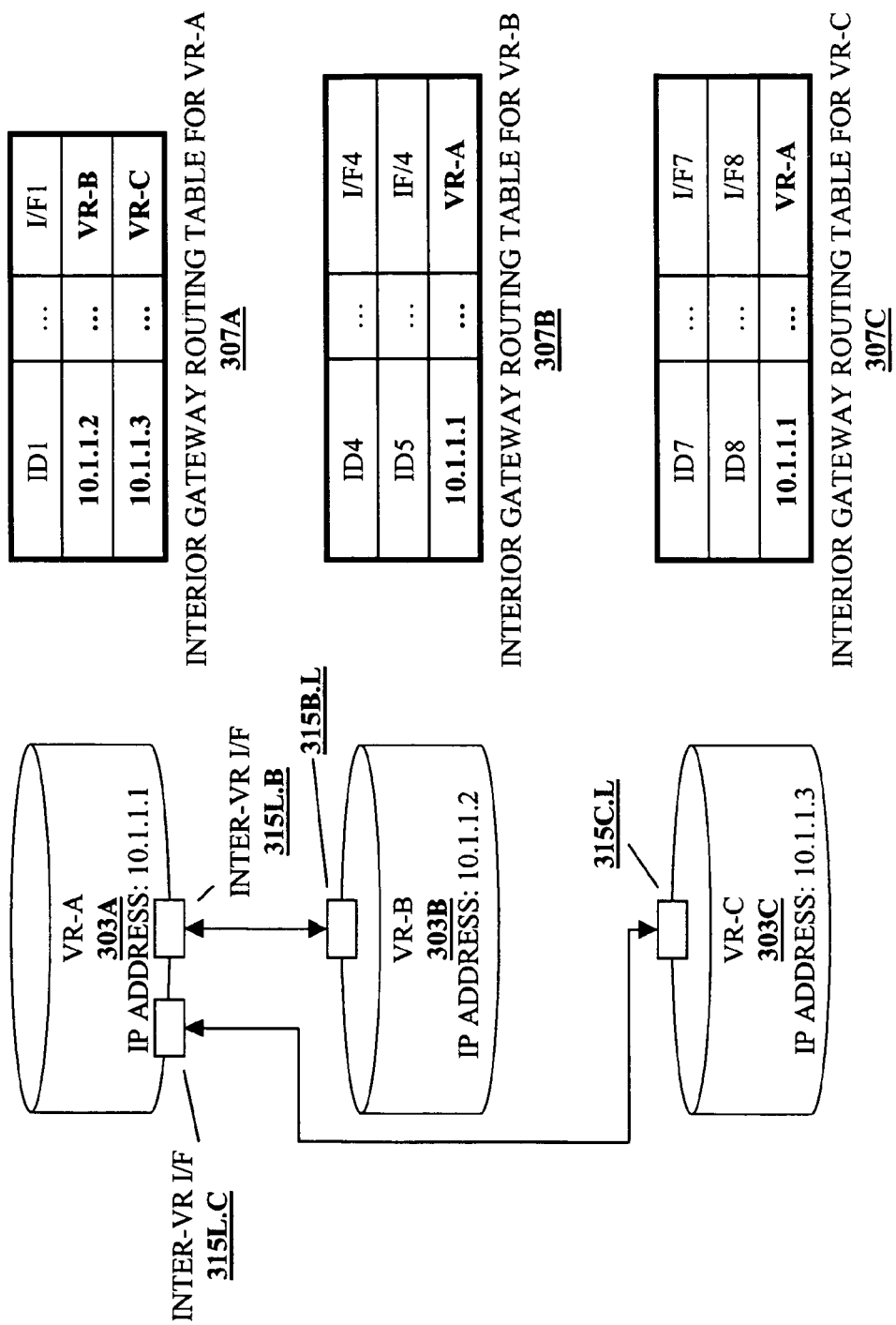
FIG. 3A is an exemplary diagram illustrating peering of virtual routers according to one embodiment of the invention.
Figure 3B:
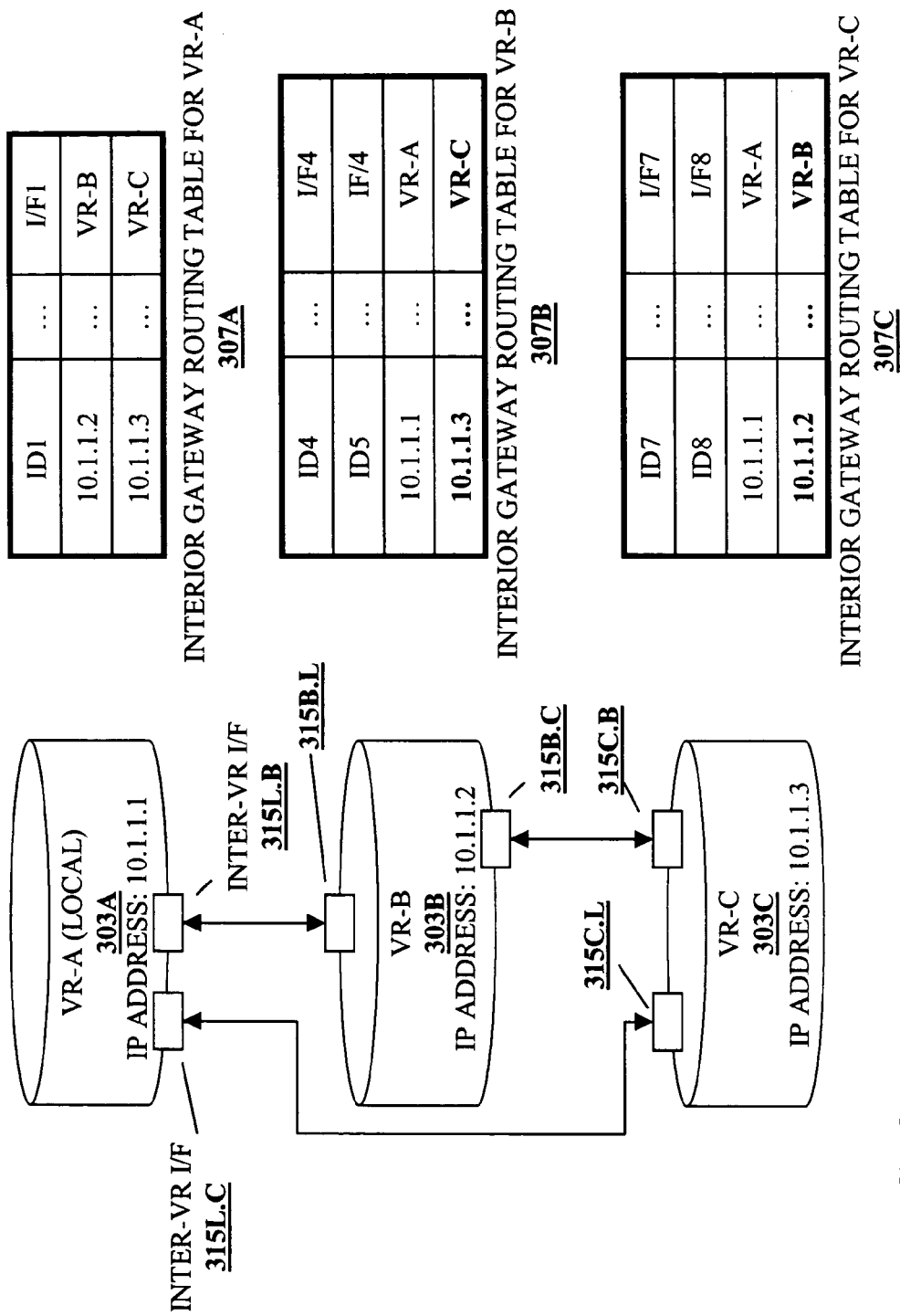
FIG. 3B is an exemplary diagram illustrating additional peering of virtual routers according to one embodiment of the invention.
Figure 3C:
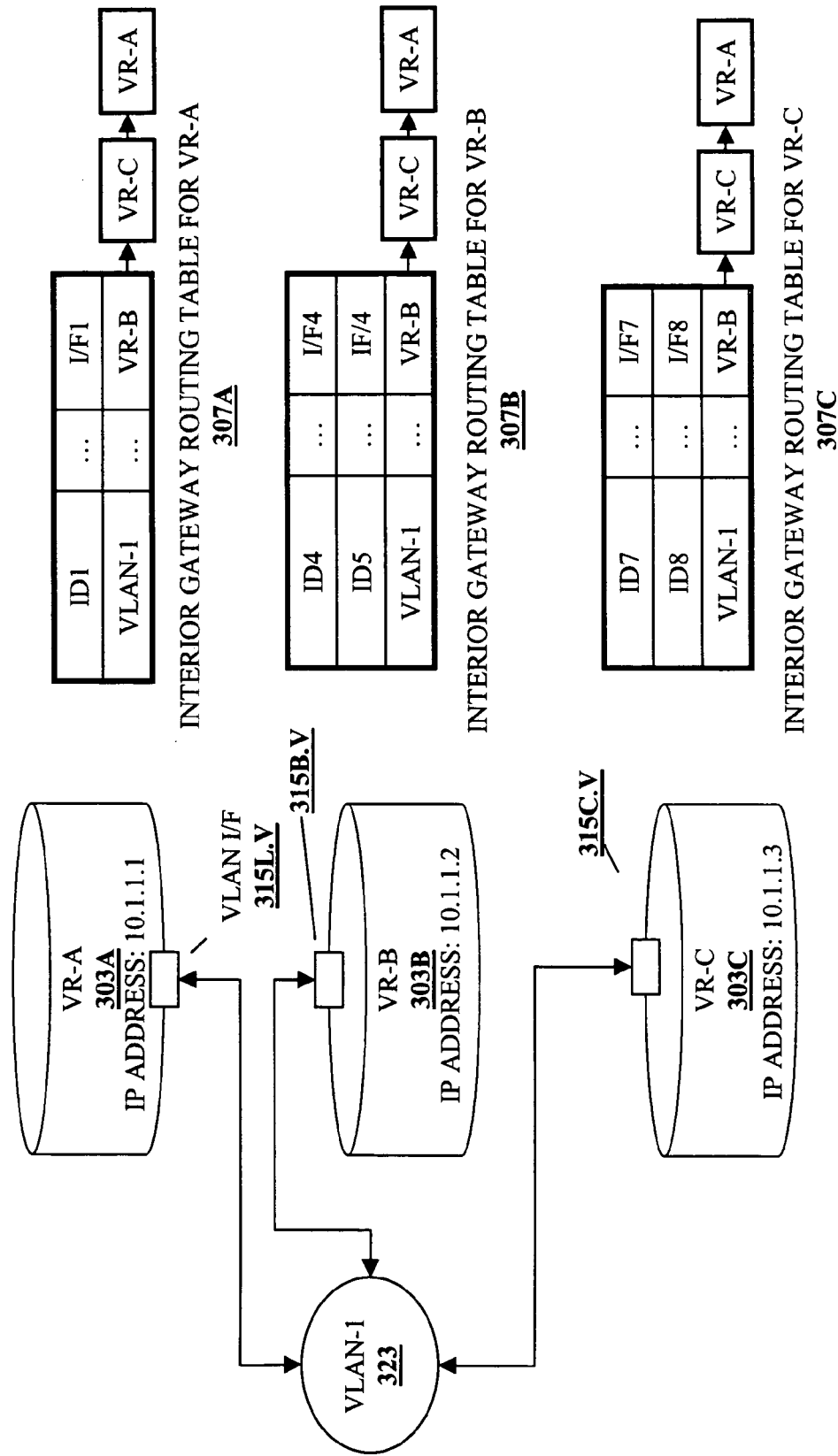
FIG. 3C is an exemplary diagram illustrating inter-VR interfaces as local area network interfaces according to one embodiment of the invention.

FIGS. 3A-3C are exemplary diagrams illustrating interior gateway routing tables being built with inter-VR routes according to one embodiment of the invention. FIG. 3A is an exemplary diagram illustrating peering of virtual routers according to one embodiment of the invention. In FIG. 3A, a virtual router 303A (VR-A) is peered with virtual routers 303B and 303C. The virtual routers 303A, 303B, and 303C respectively have IP addresses 10.1.1.1, 10.1.1.2, and 10.1.1.3. The virtual routers are peered with static routing (i.e., an administrator configures the connections between the virtual routers). An administrator configures an inter-VR interface 315L.B on the virtual router 303A to reach the virtual router 303B and an inter-VR interface 315L.C also on the virtual router 303A to reach the virtual router 303C. While configuring the interfaces on the virtual router 303A, the administrator also configures inter-VR interfaces 315B.L and 315C.L respectively on the virtual routers 303B and 303C. In response to the configuration, the interior gateway routing tables of the virtual routers are updated.

An interior gateway routing tables 307A for the virtual router 303A is updated to include a routing entry that indicates destination 10.1.1.2 reachable via next hop VR-B and a destination 10.1.1.3 reachable via next hop VR-C. While in one embodiment, the next hops to a virtual router are indicated with a VR identifier, alternative embodiments of the invention may indicate a virtual router next hop with the virtual router's name or IP address.

An interior gateway routing tables 307B for the virtual router 303B is updated to include a routing entry that indicates a destination 10.1.1.1 reachable via inter-VR interface 315B.L, which is the VR identifier for the virtual router 303A. An interior gateway routing tables 307C for the virtual router 303C is updated to include a routing entry that indicates the destination 10.1.1.1 reachable via inter-VR interface 315C.L.

In an embodiment that processes packets sent over inter-VR interfaces with a single routing process, a packet can be processed without inter-process communication. For example, if RIP is configured on inter-VR interface 315L.B and the RIP process sends a packet over the inter-VR interface 315L.B, the RIP packet immediately considers the packet as received on the inter-VR interface 315B.L by the single RIP process. Routing processes (both interior and exterior gateway routing protocol processes) can exchange routing information via the inter-VR interfaces. The routing processes download these routes into the main routing table using inter-VR interfaces as next hops.

FIG. 3B is an exemplary diagram illustrating peering of virtual routers that are not virtual router local (virtual router 303A) according to one embodiment of the invention. In FIG. 3B, the virtual routers 303B and 303C have been connected. The virtual router 303B has been configured to reach the virtual router 303C via the inter-VR interface 315B.C and the virtual router 303C has been configured to reach the virtual router 303B via the inter-VR interface 315C.B. Various techniques can be implemented to prevent redundant connections being created between virtual routers. In one embodiment of the invention, a check is performed when the administrator enters a configuration that binds interfaces of two virtual routers.

In another embodiment of the invention, an inter-VR point-to-point (p2p) interface is utilized. The interface manager ensures only a single bind number is utilized to connect a pair of virtual routers, although alternative embodiments of the invention may allow for multiple connections between virtual routers. An interior gateway routing protocol process registers an interest in the configured interfaces for each virtual router with the interface manager. In response, the interface manager provides the registering interior gateway routing protocol process with the corresponding bind number, bound virtual router, and the type of interface. For example, assume the following configuration is entered:

virtualrouter A
    interface I/F1 inter-VR-p2p bind1
    igp router networka
    virtualrouter B
    interface I/F2 inter-VR-p2p bind1
    igp router networkB The first set of configuration commands configures the interface I/F1 on the virtual router A. The second set of commands configures the interface I/F2 on the virtual router B. The interface manager creates a tuple that reflects the configuration of these interfaces on their corresponding virtual routers. When the interior gateway routing protocol process learns this inter-VR interface binding from the interface state manager, the interior gateway routing protocol process can do peering between VR-A and VR-B across this inter-VR interface as if VR-A and VR-B were two separate network elements.

FIG. 3C is an exemplary diagram illustrating inter-VR interfaces as local area network interfaces according to one embodiment of the invention. In FIG. 3C, each of the virtual routers 303A, 303B and 303C are connected to a virtual router local area network (VR-LAN) 323. The VR-LAN 323 is identified as VR-LAN-1. Although the virtual routers 303A, 303B and 303C are illustrated as being connected to the VR-LAN 323 for this example, fewer or more virtual routers may be connected to the VR-LAN. In addition, multiple VR-LANs can be defined with various different groups of virtual routers connected to the different VR-LANS. For example, VR-B, VR-C and VR-A may be connected to VR-LAN-1, while VR-A, VR-C are connected to VR-LAN-2. Alternatively, VR-LAN-1 may comprise VR-A, VR-B and VR-C while VR-LAN-2 may comprise VR-A, VR-B, and VR-C.

After the administrator configures VR-LAN interfaces 315L.V, 315B.V, and 315C.V respectively on the virtual routers 303A, 303B and 303C, the interior gateway routing protocol process registers an interest in the interface 315L.V for the virtual router 303A with the interface manager. The interface manager provides the registering interior gateway routing protocol process with the associated VR-LAN number, VR-LAN-1, which identifies the VR-LAN 323. While in one embodiment of the invention, the interior gateway routing protocol process accesses a data structure (e.g., a linked list) which indicates each VR-LAN interface associated with the VR-LAN identified by the interface manager, alternative embodiments of the invention may provide the interior gateway routing protocol process the associated VR-LAN interfaces differently (e.g., the interface manager may maintain a data structure that indicates the VR-LAN and associated VR-LAN interfaces). The interior gateway routing protocol process updates its interior gateway routing tables to indicate the associated VR-LAN interfaces as illustrated in FIG. 3C. In an alternative embodiment of the invention, the interior gateway routing protocol process accesses the VR-LAN data structure that indicates associated VR-LAN interfaces instead of inserting the data structure in the interior gateway routing table. When the interior gateway routing protocol process transmits a control packet, the interior gateway routing protocol processes transmits to each VR-LAN interface associated with the VR-LAN. After transmitting the control packet, the interior gateway routing protocol process marks the associated VR-LAN interfaces as received. For example, assume OSPF is configured on interfaces 315L.V, 315B.V, 315C.V. If OSPF sends a packet on 315B.V to the VR-LAN 323 for the VR-B 303B, the sent OSPF packet is implicitly received on the interfaces 315L.V and 315C.V. In an embodiment that implements a single routing process for more than one virtual router, the single routing process (e.g., OSPF) handles the sending and receiving without inter-process communication.

Regardless of the interface technique being used, packets forwarded between virtual routers are passed directly between virtual routers and not passed down for lower layer processing. In alternative embodiments of the invention, packets may be passed down for lower layer processing (e.g., to the kernel socket, which is a communication channel between routing processes and the data plane that includes line cards) to maintain agnostic routing or minimize the amount of modification made to routing protocols.

Figure 4:
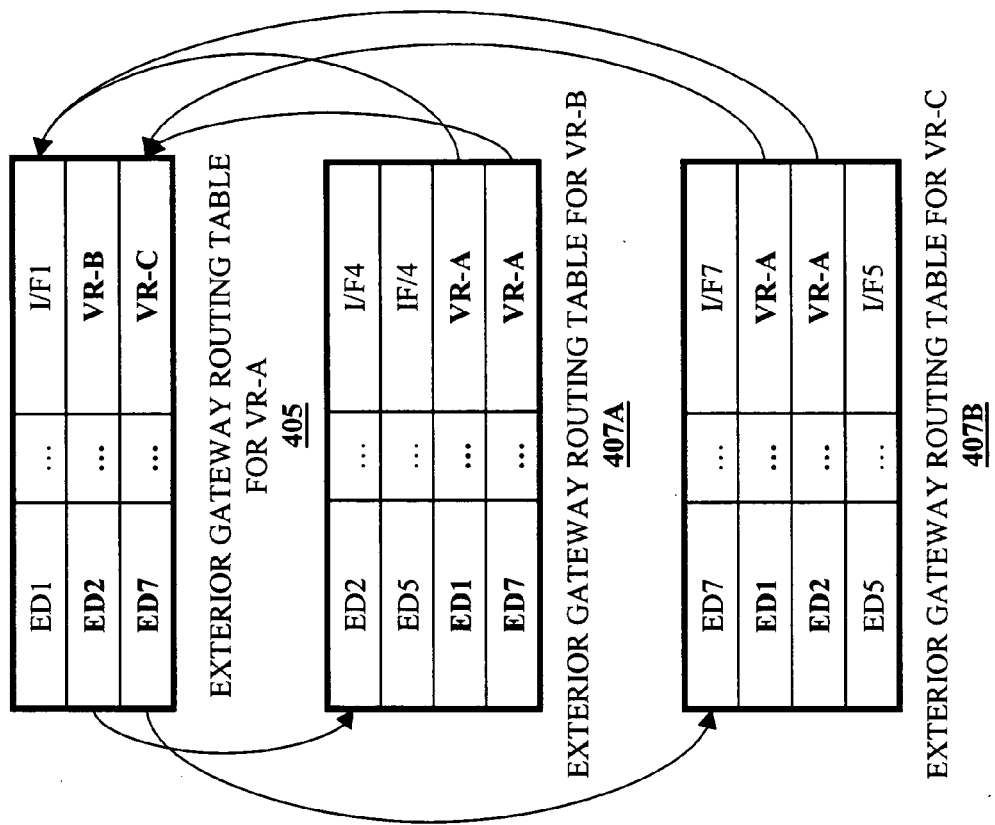
FIG. 4 is an exemplary diagram illustrating external route distribution between virtual routers according to one embodiment of the invention.
Figure 4:
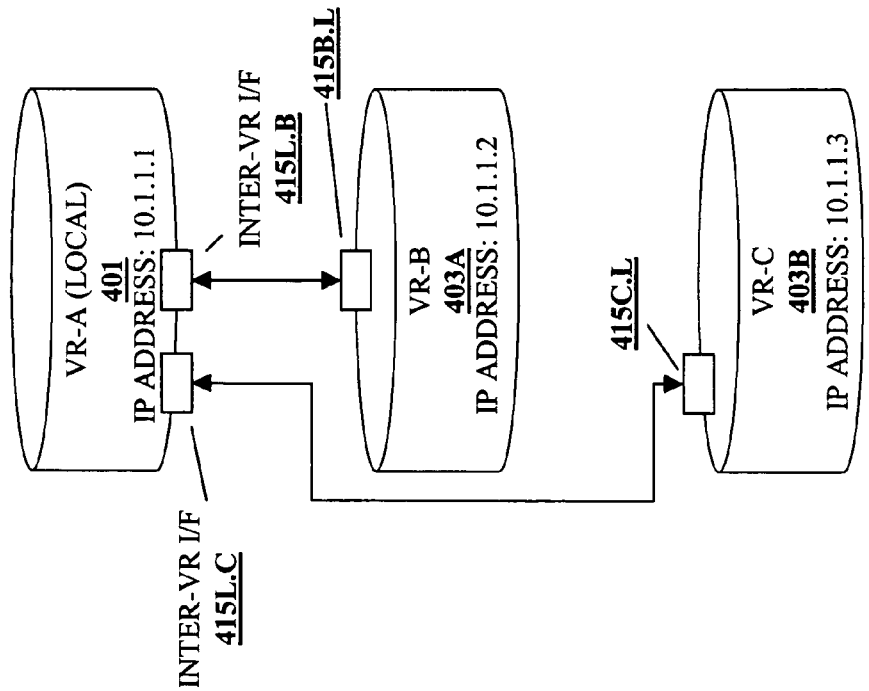

FIG. 4 is an exemplary diagram illustrating external route distribution between virtual routers according to one embodiment of the invention. In FIG. 4, a virtual router 401 with IP address 10.1.1.1 is peered with virtual routers 403A and 403B via inter-VR interfaces 415L.B and 415L.C, respectively. The peering is established with either static routing or with interior gateway routing protocol process. The virtual routers 401, 403A and 403B respectively have exterior gateway routing tables 405, 407A and 407B. The bolded entries in the exterior gateway routing tables 405, 407A, and 407B have been learned from other virtual routers.

The virtual router 401 has learned routes to external destinations ED2 and ED7 directly from virtual routers 403A and 403B, respectively. The virtual router 403A has learned routes to external destinations ED1 and ED7 from the virtual router 401. The virtual router 403B has learned routes to external destinations ED1, ED2, and ED5 from the virtual router 401.

Various route distribution policies can be applied to distribution of routes between virtual routers. If a customer does not want routes from its virtual router distributed, then the customer's virtual router should not be peered with any other virtual routers that do not fall under the customer's control. A policy may be implemented on a network element that allows the virtual router local to learn routes but not distribute routers. Alternatively, certain routes may be tagged as either restricted or unrestricted for inter-VR route distribution.

Figure 5:
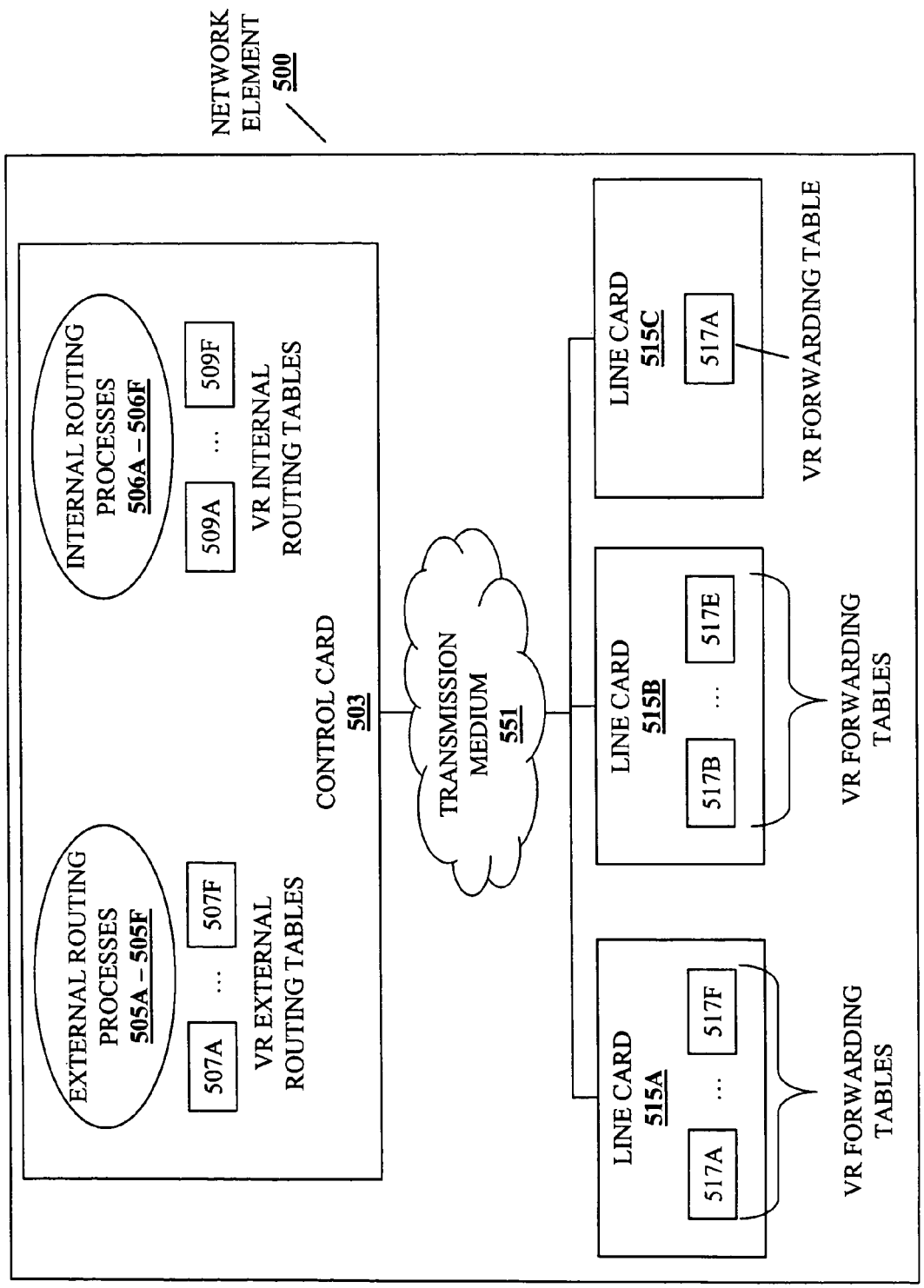
FIG. 5 is a diagram of an exemplary network element according to one embodiment of the invention.

FIG. 5 is a diagram of an exemplary network element according to one embodiment of the invention. In FIG. 5, a network element 500 includes a control card 503 coupled with a set of line cards 515A-515C via a transmission medium 551 (e.g., a packet mesh, switching medium, etc.). The control card 503 hosts external routing processes 505A-505F and corresponding exterior gateway routing tables 507A -507F. The control card 503 also hosts internal routing processes 506A-506F and corresponding interior gateway routing tables 509A-509F. Each of the internal routing processes 506A-506F and their corresponding VR interior gateway routing tables 509A -509F are used by a different virtual router configured on the network element 500. Each of the external routing processes 505A-505F and their corresponding VR exterior gateway routing tables 507A-507F are used by the different virtual router configured on the network element 500.

Each of the line cards 515A-515C include one or more forwarding tables. The line card 515A includes VR forwarding tables 517A-517F. The line card 515B includes VR forwarding tables 517B-517E. The line card 515C includes the VR forwarding table 517A. The forwarding tables 517A-517F are created from forwarding information downloaded from the control card 503. Each of the VR forwarding tables corresponds to a different virtual router configured on the network element 500. In an alternative embodiment of the invention, a virtual router uses more than one VR forwarding table, VR interior gateway routing table, and/or VR exterior gateway routing table. In another alternative embodiment of the invention, a single external and/or internal routing process is shared by different virtual routers.

The control card 503 and line cards 517A-517C illustrated in FIG. 5 and the network elements described in the Figures include memories, processors, and/or ASICs. Such memories include a machine-readable medium on which is stored a set of instructions (i.e., software) embodying any one, or all, of the methodologies described herein. Software can reside, completely or at least daily, within this memory and/or within the processor and/or ASICs. For the purpose of this specification, the term "machine-readable medium" shall be taken to include any mechanism that provides (i.e., stores and/or transmits) information in a form readable by a machine (e.g., a computer). For example, a machine-readable storage medium includes read only memory ("ROM"), random access memory ("RAM"), magnetic disk storage media, optical storage media, flash memory devices, and a machine-readable transmission medium includes any medium along which electrical, optical, acoustical, or other forms of propagated signals (e.g., carrier waves, infrared signals, digital signals, etc.) an be transmitted etc.

While the invention has been described in terms of several embodiments, those skilled in the art will recognize that the invention is not limited to the embodiments described. The method and apparatus of the invention can be practiced with the modification and alteration within the spirit and scope of the appended claims. The description is thus to be regarded as illustrative instead of limiting on the invention.

I claim:

1. A single network element comprising:
 a control card, coupled to a plurality of line cards, having a set of instructions to cause the
 control card to,
 instantiate a first virtual router and a second virtual router in the single network element, wherein:
 the first virtual router includes a first routing table to be stored on the control card and a first routing protocol process, the first routing protocol process is to insert into the first routing table a plurality of routes, each route to indicate a destination and a next hop wherein at least one route's next hop is an inter-virtual router interface coupled to the second virtual router and at least one route's next hop is one of a set of one or more egress ports that each corresponds to an outgoing interface, the second virtual router includes a second routing table to be stored on the same control card as the first routing table and a second routing protocol process, the second routing protocol process is to insert into the second routing table a plurality of routes each route to indicate a destination and a next hop, the first virtual router and second virtual router are coupled within the single network element through the inter-virtual router interface, wherein traffic from the first virtual router destined for the second virtual router is configured to travel through the inter-virtual router interface and not travel through the set of one or more egress ports, and the first routing table is a separate routing table from the second routing table, and download one or more routes from the routing tables to different forwarding tables on different ones of the plurality of line cards; and the plurality of line cards configured to:
store the forwarding tables, wherein each forwarding table corresponds to a different virtual router, and
store different routes downloaded from the control card in the forwarding tables on the different line cards.

2. The network element of claim 1 further comprising a transmission medium to carry routes to said set of line cards.

3. The network element of claim 1 wherein the the inter-virtual router interface is bound to a virtual router handle.

4. The network element of claim 1 wherein the set of instructions further cause the control card to host a set of one or more routing protocol processes, each of the set of routing protocol processes corresponding to a different routing protocol, the set of routing protocol processes to process packets for a plurality of virtual routers supported by the network element.

5. The network element of claim 1, wherein the the inter-virtual router interface is bound to an IP address.

* * * * *

UNITED STATES PATENT AND TRADEMARK OFFICE
CERTIFICATE OF CORRECTION

Page 1 of 1

PATENT NO. : 8,045,547 B2
APPLICATION NO. : 10/883425
DATED : October 25, 2011
INVENTOR(S) : Shen It is certified that error appears in the above-identified patent and that said Letters Patent is hereby corrected as shown below:

In Column 1, Line 50, delete "advantage" and insert -- advantages --, therefor.

In Column 2, Line 3, delete "the" and insert -- the present --, therefor.

In Column 8, Line 34, delete "daily," and insert -- partially, --, therefor.

In Column 8, Line 46, delete "an" and insert -- can --, therefor.

In Column 8, Lines 50-51, delete "with the" and insert -- with --, therefor.

In Column 10, Line 8, in Claim 3, delete "the the" and insert -- the --, therefor.

In Column 10, Line 17, in Claim 5, delete "the the" and insert -- the --, therefor.

Signed and Sealed this
Fourteenth Day of February, 2012

David J. Kappos
*Director of the United States Patent and Trademark Office*